(12) United States Patent
Lu et al.

(10) Patent No.: US 10,522,982 B2
(45) Date of Patent: Dec. 31, 2019

(54) GAS INSULATION SWITCH CABINET AND SWITCH DEVICE

(71) Applicant: Schneider Electric Industries SAS, Rueil-Malmaison (FR)

(72) Inventors: Haifeng Lu, Shanghai (CN); Yanfang Ma, Shanghai (CN); Jean-Pierre Meley, St Ismier (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 0 days.

(21) Appl. No.: 15/826,959

(22) Filed: Nov. 30, 2017

(65) Prior Publication Data

US 2018/0166866 A1 Jun. 14, 2018

(30) Foreign Application Priority Data

Dec. 14, 2016 (CN) .......................... 2016 1 1152552

(51) Int. Cl.
| | | |
|---|---|---|
| *H02B 13/035* | (2006.01) | |
| *H02B 1/20* | (2006.01) | |
| *H02B 1/32* | (2006.01) | |
| *H02B 1/30* | (2006.01) | |
| *H02B 13/045* | (2006.01) | |
| *H02B 1/04* | (2006.01) | |
| *H02B 1/22* | (2006.01) | |

(52) U.S. Cl.
CPC ............. *H02B 13/035* (2013.01); *H02B 1/04* (2013.01); *H02B 1/20* (2013.01); *H02B 1/22* (2013.01); *H02B 1/32* (2013.01); *H02B 1/30* (2013.01); *H02B 13/045* (2013.01)

(58) Field of Classification Search
CPC ...... H02B 13/035; H02B 13/045; H02B 1/22; H02B 1/20; H02B 1/04; H02B 1/30; H02B 1/32
USPC .................................................. 361/600–626
See application file for complete search history.

(56) References Cited

U.S. PATENT DOCUMENTS

| | | | |
|---|---|---|---|
| 4,658,239 A | 4/1987 | Grallert | |
| 4,658,329 A * | 4/1987 | Kamura | ............ H02B 13/0352 361/601 |

(Continued)

FOREIGN PATENT DOCUMENTS

| | | |
|---|---|---|
| CN | 2427910 Y | 4/2001 |
| CN | 2528133 Y | 12/2002 |

(Continued)

OTHER PUBLICATIONS

English Language Translation of Abstract for Chinese Patent Application Publication No. CN2528133Y, published Dec. 25, 2002, 1 page.

(Continued)

*Primary Examiner* — Zachary Pape
(74) *Attorney, Agent, or Firm* — Locke Lord LLP (57) ABSTRACT

A gas insulation switch cabinet and a switch device are provided. The gas insulation switch cabinet includes: a cabinet body; and a cable chamber, a breaker chamber and a busbar chamber which are in the cabinet body and configured that a current sequentially flows through the cable chamber, the breaker chamber and the busbar chamber. The gas insulation switch cabinet further includes a cable side disconnecting switch between the cable chamber and the breaker chamber in a flowing direction of the current.

13 Claims, 8 Drawing Sheets

(56) References Cited

U.S. PATENT DOCUMENTS

| | | | | |
|---|---|---|---|---|
| 7,193,172 | B2* | 3/2007 | Rokunohe | H01H 33/22 218/43 |
| 8,946,581 | B2* | 2/2015 | Yabu | H01H 33/66207 218/119 |
| 2011/0261506 | A1* | 10/2011 | Narin | H02B 1/22 361/611 |
| 2015/0279603 | A1* | 10/2015 | Lang | H01H 69/00 200/293 |

FOREIGN PATENT DOCUMENTS

| | | |
|---|---|---|
| CN | 2662501 Y | 12/2004 |
| CN | 2662506 Y | 12/2004 |
| CN | 102176612 A | 9/2011 |
| CN | 203119377 U | 8/2013 |
| CN | 106159787 A | 11/2016 |

OTHER PUBLICATIONS

English Language Translation of Abstract for Chinese Patent Application Publication No. CN2662506Y, published Dec. 8, 2004, 1 page.

English Language Translation of Abstract for Chinese Patent Application Publication No. CN203119377U, published Aug. 7, 2013, 1 page.

English Language Translation of Abstract for Chinese Patent Application Publication No. CN106159787A, published Nov. 23, 2016, 1 page.

English Language Translation of Abstract for Chinese Patent Application Publication No. CN2662501Y, published Dec. 8, 2004, 1 page.

English Language Translation of Abstract for Chinese Patent Application Publication No. CN102176612A, published Sep. 7, 2011, 1 page.

Chinese Office Action dated Feb. 19, 2019 for Chinese Patent Application No. 201611152552.X, 7 pages.

English Language Translation of Chinese Office Action dated Feb. 19, 2019 for Chinese Patent Application No. 201611152552.X, 5 pages.

English Language Translation of Abstract for Chinese Patent Application Publication No. CN2427910Y, published Apr. 25, 2001, 1 page.

Chinese Office Action dated Oct. 28, 2019 for Chinese Patent Application No. 201611152552.X, 7 pages.

English language translation of Chinese Office Action dated Oct. 28, 2019 for Chinese Patent Application No. 201611152552.X, 6 pages.

* cited by examiner

GAS INSULATION SWITCH CABINET AND SWITCH DEVICE

This application claims the benefit under 35 U.S.C. § 119 of Chinese Patent Application No. 201611152552.X, filed on Dec. 14, 2016, which is hereby entirely incorporated by reference as a part of the present application.

TECHNICAL FIELD

Embodiments of the present disclosure relate to a gas insulation switch cabinet and a switch device.

BACKGROUND

A gas insulation switch cabinet is an enclosed electrical apparatus adopting gas as an insulating medium. The gas insulation switch cabinet includes a breaker, a disconnecting switch, a ground switch, a transformer, a lightning arrester, a busbar, a connecting piece, an outlet terminal, etc. These components are enclosed in a metal ground cabinet body, and the cabinet body is filled with insulating gas with a certain pressure.

In recent years, with the construction and transformation of urban power grid in China and the development of rail transit and large industrial and mining enterprises, new high demands such as miniaturization, intelligence, maintenance-free and all work conditions are put forward for switch devices. The gas insulation switch device is sealed, adopts gas as an insulating medium and hence may be applicable to a variety of environmental conditions. Moreover, the gas insulation switch device is rapidly promoted and applied in our country due to the advantages of small size, light weight, good safety, high reliability, capability of being used in harsh environments, etc.

SUMMARY

At least one embodiment of the present disclosure provides a gas insulation switch cabinet which includes: a cabinet body; a cable chamber, a breaker chamber and a busbar chamber which are in the cabinet body and configured that a current sequentially flows through the cable chamber, the breaker chamber and the busbar chamber; and a cable side disconnecting switch between the cable chamber and the breaker chamber in a flowing direction of the current.

At least one embodiment of the present disclosure further provides a switch device which includes: a cabinet body; a lead-in cable joint in the cabinet body; a cable side disconnecting switch which is in the cabinet body and includes a current input terminal and a current output terminal, with the current input terminal of the cable side disconnecting switch connected with the lead-in cable joint; and a breaker which is in the cabinet body and includes a current input terminal and a current output terminal, with the current input terminal of the breaker electrically connected with the current output terminal of the cable side disconnecting switch.

DETAILED DESCRIPTION

Figure 1:
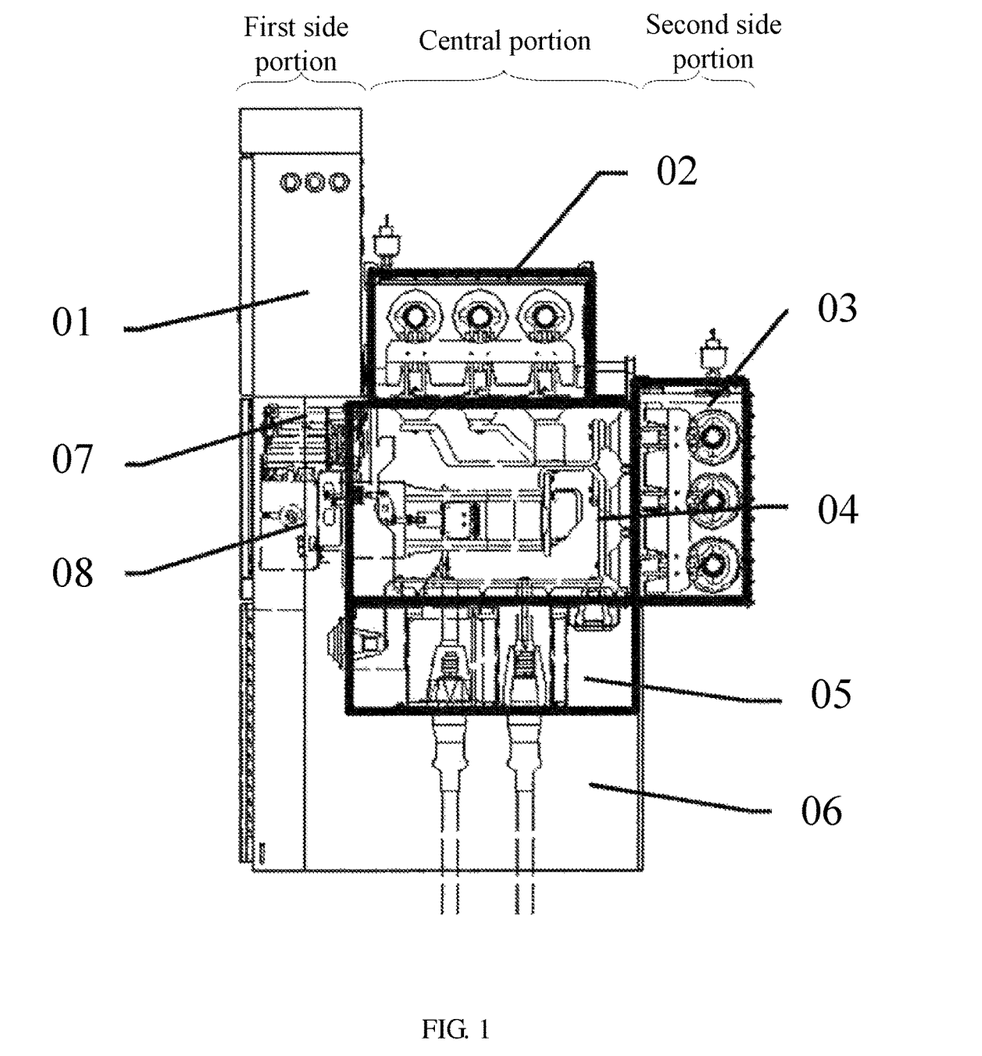
FIG. 1 is a front disassembly view of a partial cabinet body of a double-busbar gas insulation switch cabinet.

FIG. 1 is a front disassembly view of a partial cabinet body of a double-busbar gas insulation switch cabinet, in which main components of the double-busbar gas insulation switch cabinet are shown. As illustrated in FIG. 1, the double-busbar gas insulation switch cabinet includes: a low-voltage chamber 01, an upper busbar chamber 02 provided with a disconnecting switch (namely a 3 position switchgear (3PS)), a rear busbar chamber 03 provided with n disconnecting switch (namely a 3 position switchgear), a breaker chamber 04, a current transformer 05, a cable chamber 06, an operating mechanism 07 of the disconnecting switches of the upper busbar chamber 02 and the rear busbar chamber 03, a breaker operating mechanism 08 and a framework (namely a cabinet body). Low-voltage devices used for protection, control and monitoring and terminal strips are mounted in the low-voltage chamber 01. A lead-in cable is accessed into the cable chamber 06 through a cable sleeve disposed in the cable chamber 06. The breaker chamber 04 is provided with a breaker which is used for circuit protection. The disconnecting switch operating mechanism 07 and the breaker operating mechanism 08 are disposed in an operating mechanism chamber and respectively used for operating the disconnecting switches and the breaker. The upper busbar chamber 02 is provided with an upper main busbar. The rear busbar chamber 03 is provided with a rear main busbar.

According to the layout of the double-busbar gas insulation switch cabinet shown in FIG. 1, the cabinet body of the double-busbar gas insulation switch cabinet includes a first side portion, a second side portion, and a central portion between the first side portion and the second side portion along the thickness direction (referring to the horizontal direction in FIG. 1). As can be seen from FIG. 1, the low-voltage chamber 01 is at an upper part of the first side portion along the height direction of the cabinet body (referring to the vertical direction in FIG. 1); the disconnecting switch operating mechanism 07 and the breaker operating mechanism 08 are disposed at a middle part of the first side portion along the height direction of the cabinet body and disposed below the low-voltage chamber 01; the upper busbar chamber 02 is at an upper part of the central portion along the height direction of the cabinet body; the breaker chamber 04 is disposed at a middle part of the central portion along the height direction of the cabinet body; the transformer 05 is at a lower part of the central portion along the height direction of the cabinet body; the cable chamber 06 includes a portion at a lower part of the central portion along the height direction of the cabinet body and a portion at a lower part of the first side portion; and the rear busbar chamber 03 is disposed at a middle part of the second side portion along the height direction of the cabinet body.

The inventors of the present application noted in the study that: as for a gas insulation switch cabinet in which a disconnecting switch is only disposed on the busbar side, in the case of failure of an incoming cabinet (namely the gas insulation switch cabinet), the power supply of the incoming cabinet can only be cut off by cutting off a superior power supply unit; the superior power supply unit may be far away from the defective gas insulation switch cabinet or inconvenient to access, and this results in inconvenience in actual use; in addition, as the superior power supply unit and the gas insulation switch cabinet are not at the same position, in the process of dealing with the fault, the case of wrongly closing the power supply unit may occur, resulting in potential safety hazard.

Therefore, a gas insulation switch device capable of being electrically isolated on an incoming side of the gas insulation switch device when required is needed.

At least one embodiment of the present disclosure provides a gas insulation switch cabinet which includes: a cabinet body; a cable chamber, a breaker chamber and a busbar chamber which are disposed in the cabinet body and allow a current to flow across the cable chamber, the breaker chamber and the busbar chamber in turn; and a cable side disconnecting switch between the cable chamber and the breaker chamber in the flowing direction of the current. That is to say, in the gas insulation switch cabinet, the current flows across the cable chamber, the cable side disconnecting switch (namely an incoming side disconnecting switch), the breaker chamber and the busbar chamber in turn.

For instance, the gas insulation switch cabinet may be a single-busbar gas insulation switch cabinet, a double-busbar gas insulation switch cabinet or any other type of gas insulation switch cabinet.

For instance, the cabinet body is a metal cabinet body and filled with an insulating gas in the working process of the gas insulation switch cabinet, and the insulating gas is taken as an insulating medium between electronic elements in the cabinet body.

The cable chamber is configured to accommodate a lead-in cable through which the current flows into the gas insulation switch cabinet. For instance, in at least one embodiment, the cable chamber of the gas insulation switch cabinet is provided with a cable joint configured to be connected with the lead-in cable (namely a terminal configured to be connected with a current output terminal of the lead-in cable); and the height of the cable joint (namely the distance from the cable joint to the bottom of the cabinet body) is roughly the same with the height of the cable joint in the double-busbar gas insulation switch cabinet, and both are about 400-500 mm.

For instance, in at least one embodiment, the gas insulation switch cabinet further includes a lead-in cable; the lead-in cable includes a portion in the cable chamber; and a current output terminal of the lead-in cable is electrically connected with the current input terminal of the cable side disconnecting switch. For instance, a current output terminal of the lead-in cable is electrically connected with the current input terminal of the cable side disconnecting switch after being connected with the cable joint in the cable chamber.

The disconnecting switch is also referred to as 3 position switchgear. In the case of failure of the gas insulation switch cabinet, the power supply of the entire gas insulation switch cabinet can be cut off by switching off the cable side disconnecting switch.

The breaker chamber is provided with a breaker. The breaker is automatically switched off in the case of failure of the gas insulation switch cabinet.

For instance, the busbar chamber is provided with a main busbar and a busbar side disconnecting switch configured to cut off the main busbar. For instance, the cabinet body includes a first side portion, a second side portion, and a central portion between the first side portion and the second side portion along the depth direction of the cabinet body (namely the arrangement direction of the front and the back of the gas insulation switch cabinet); and the busbar chamber is disposed at an upper part of the central portion along the height direction of the cabinet body (namely the arrangement direction of the bottom and the top of the gas insulation switch cabinet), namely the busbar chamber is an upper busbar chamber, and correspondingly, the main busbar in the upper busbar chamber is an upper main busbar.

For instance, in at least one embodiment, the gas insulation switch cabinet further includes an operating mechanism chamber, and an operating mechanism (e.g., a controller) of the cable side disconnecting switch is disposed in the operating mechanism chamber. For instance, the operating mechanism chamber is also provided with an operating mechanism of the breaker and an operating mechanism of the busbar side disconnecting switch.

For instance, in at least one embodiment, the gas insulation switch cabinet further includes a low-voltage chamber which is provided with terminal strips and low-voltage devices used for protection, control and monitoring.

For instance, the gas insulation switch cabinet further includes a transformer (e.g., a current transformer and/or a voltage transformer) which is between the cable chamber and the breaker chamber in the flowing direction of the current. For instance, the cable side disconnecting switch is disposed at the front end of the transformer in the flowing direction of the current, namely the current also flows across the cable side disconnecting switch, the transformer, the breaker and the busbar chamber in turn after flowing into the switch cabinet from the cable chamber; or the cable side disconnecting switch is disposed at the back end of the transformer in the flowing direction of the current, namely the current also flows across the transformer, the cable side disconnecting switch, the breaker and the busbar chamber after flowing into the switch cabinet from the cable chamber.

Detailed description will be given below to the gas insulation switch cabinet provided by the embodiment of the present disclosure with reference to FIGS. 2 to 6.

Figure 2:
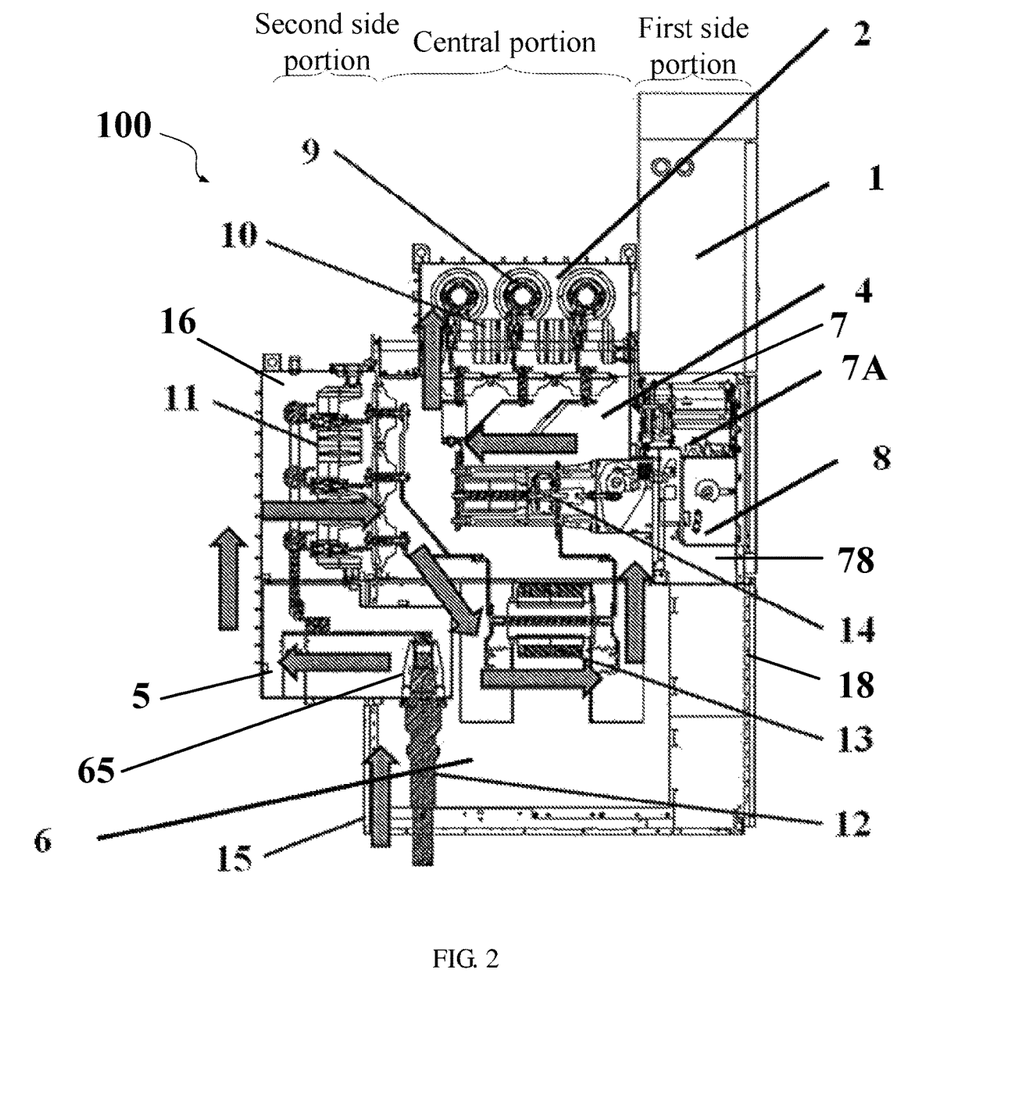
FIG. 2 is a front disassembly view of a partial cabinet body of a gas insulation switch cabinet provided by an embodiment of the present disclosure, in which the current path is shown.
Figure 3:
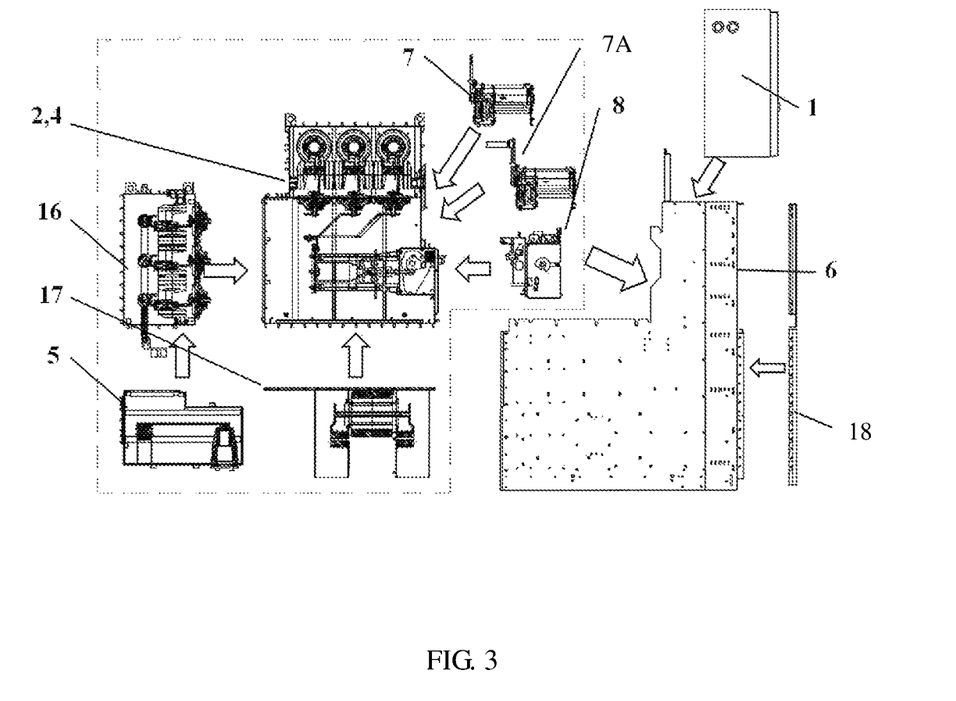
FIG. 3 is an exploded view of the gas insulation switch cabinet in FIG. 2.
Figure 4:
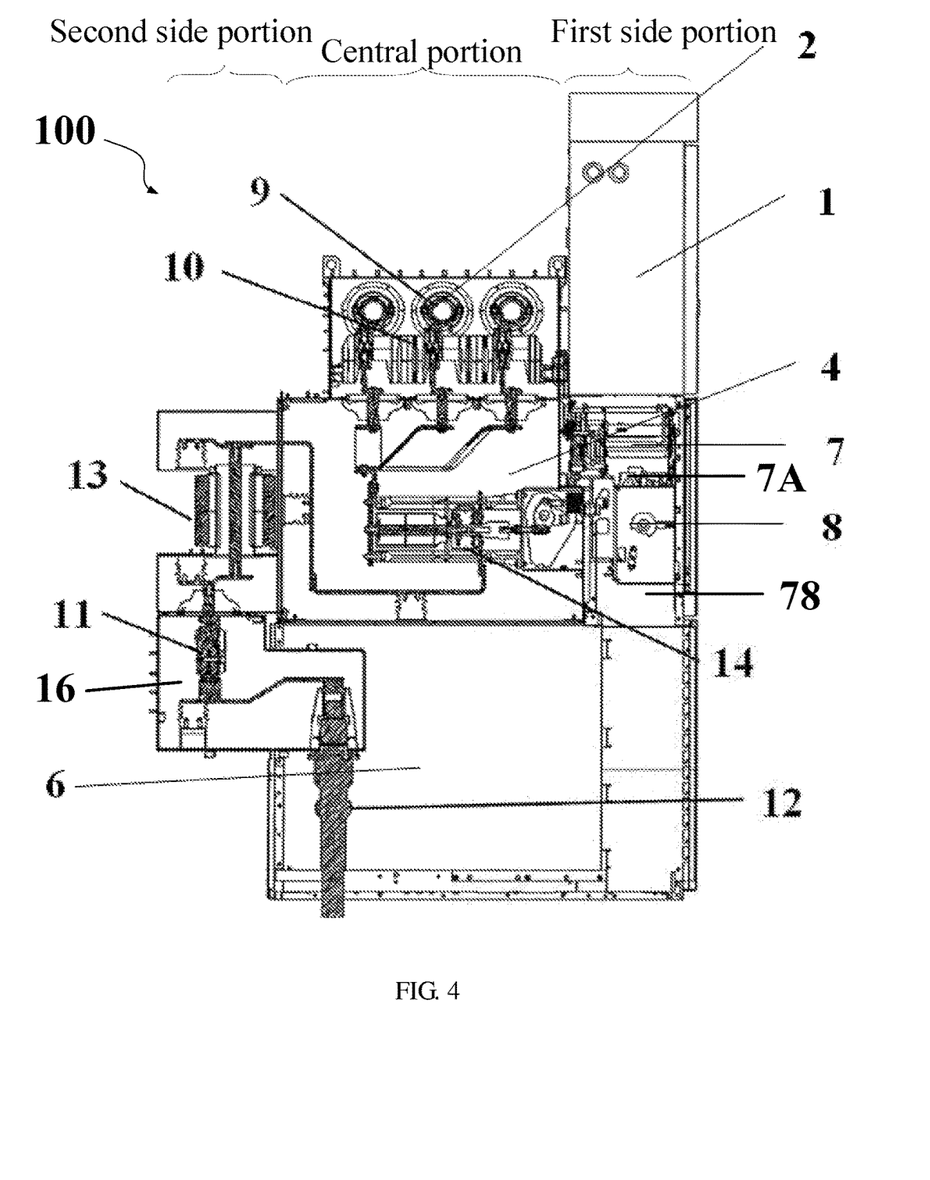
FIG. 4 is a front disassembly view of a partial cabinet body of a gas insulation switch cabinet provided by another embodiment of the present disclosure.
Figure 5:
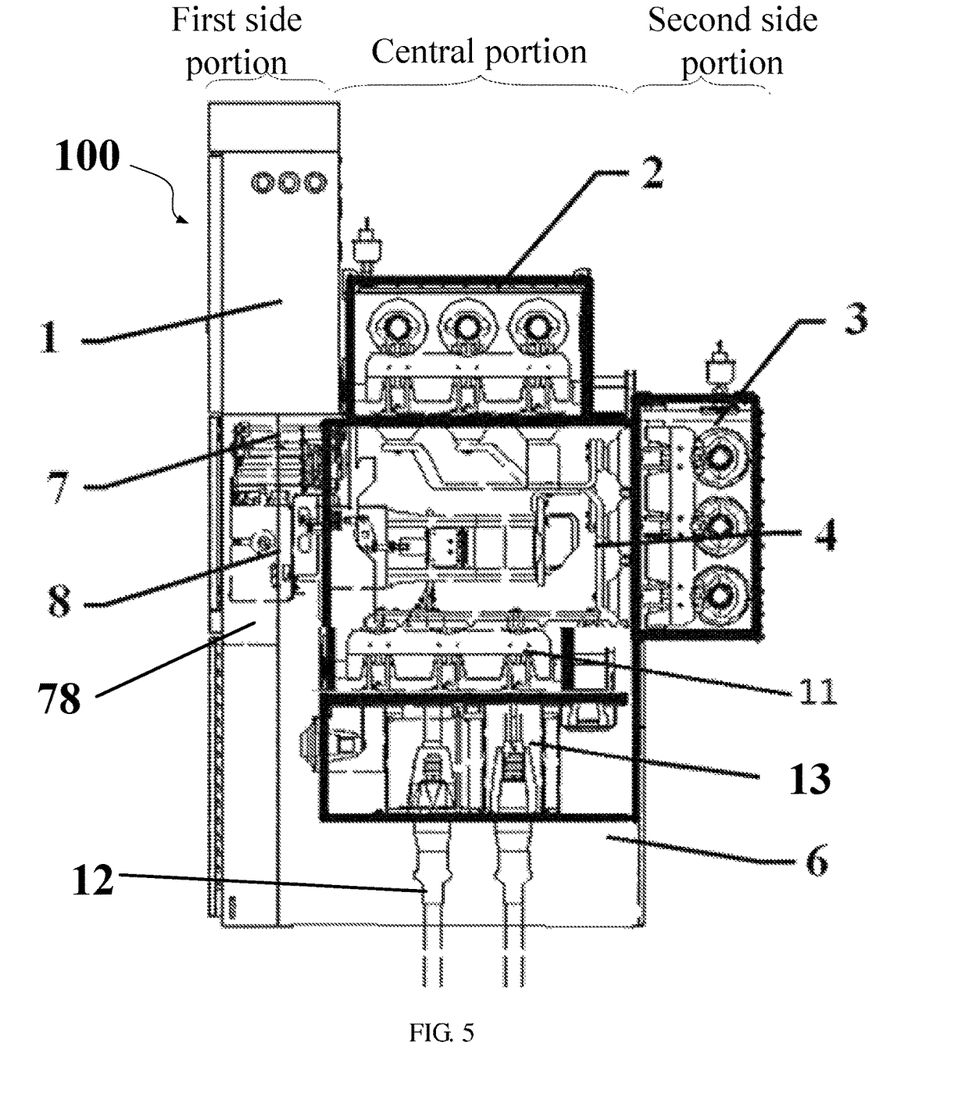
FIG. 5 is a front disassembly view of a partial cabinet body of a gas insulation switch cabinet provided by still another embodiment of the present disclosure.
Figure 6:
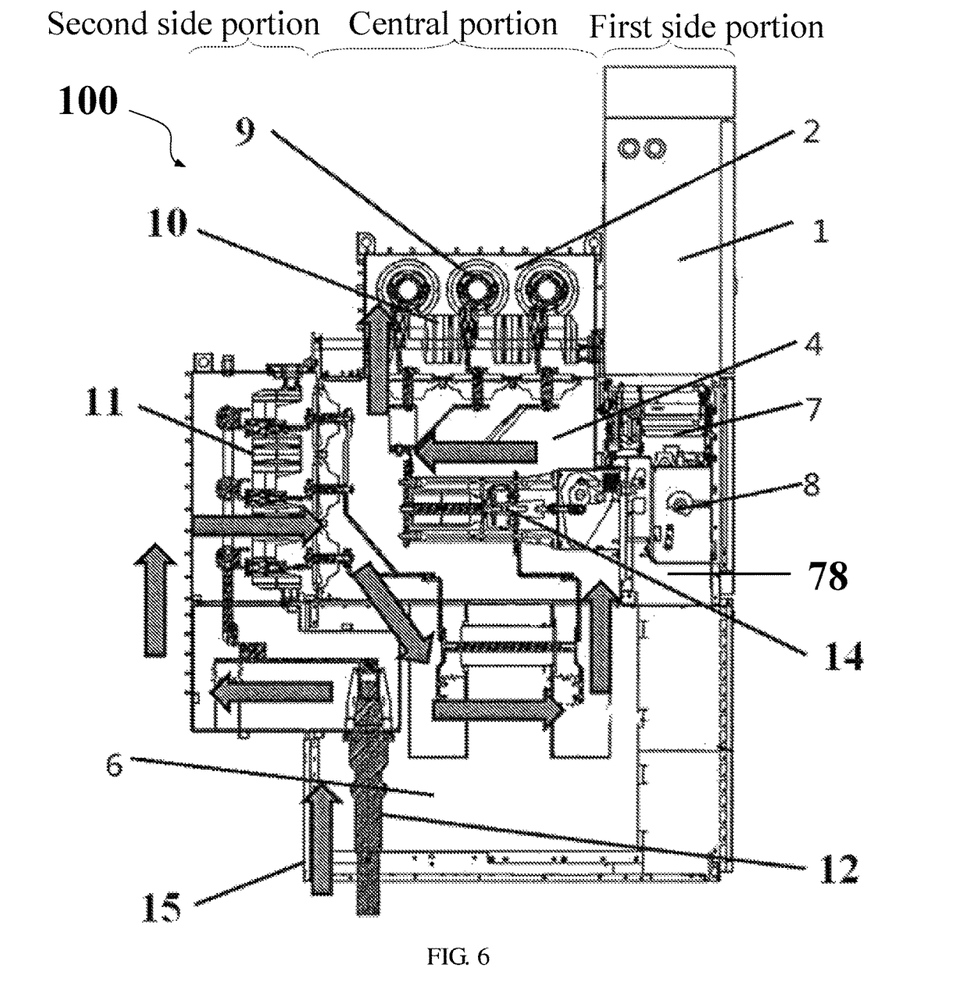
FIG. 6 is a front disassembly view of a partial cabinet body of a gas insulation switch cabinet provided by still another embodiment of the present disclosure.

For instance, as illustrated in FIGS. 2 to 6, the gas insulation switch cabinet includes: a cabinet body 100; a cable chamber 6, a breaker chamber 4 and a busbar chamber 2 which are disposed in the cabinet body 100 and allow the current to flow across the cable chamber, the breaker chamber and the busbar chamber in turn; and a cable side disconnecting switch 11 between the cable chamber 6 and the breaker chamber 4 in the flowing direction of the current. For instance, as illustrated in FIGS. 2 to 5, the gas insulation switch cabinet further includes a transformer (e.g., a current transformer and/or a voltage transformer) 13, and the cable side disconnecting switch 11 is disposed at a current input terminal (as shown in FIGS. 2-4) of the transformer 13 or at a current output terminal (as shown in FIG. 5) of the transformer 13. For instance, as shown in FIG. 6, no transformer is between the cable chamber 6 and the breaker chamber 4 in the flowing direction of the current. In addition, as illustrated in FIGS. 2 to 6, the gas insulation switch cabinet further includes a low-voltage chamber 1 and an operating mechanism chamber 78.

For instance, the cabinet body 100 includes a first side portion, a second side portion, and a central portion between the first side portion and the second side portion along the depth direction (also referred to as thickness direction, for instance, the arrangement direction of the operating mechanism chamber 78 and the breaker chamber 4) of the cabinet body 100; the first side portion includes the low-voltage chamber 1 and the operating mechanism chamber 78; and the central portion includes the busbar chamber 2 and the breaker chamber 4.

FIG. 2 is a front disassembly view of a partial cabinet body of a gas insulation switch cabinet provided by one embodiment of the present disclosure, in which the current path is shown. The embodiment is an improvement on the basis of the double-busbar gas insulation switch cabinet in FIG. 1. The cabinet body 100 of the gas insulation switch cabinet provided by the embodiment also includes a first side portion, a second side portion, and a central portion between the first side portion and the second side portion along the depth direction (referring to the horizontal direction in FIG. 2) of the cabinet body 100, and the arrangement direction of the first side portion, the second side portion and the central portion is opposite to that in FIG. 1. FIG. 3 is a schematic exploded view of the gas insulation switch cabinet in FIG. 2.

For instance, in the embodiment as shown in FIGS. 2 and 3, the cabinet body 100 of the gas insulation switch cabinet is a cabinet body of a double-busbar gas insulation switch cabinet. For instance, a cable side disconnecting switch 11 is disposed at the position provided with the rear busbar chamber 03 of the double-busbar gas insulation switch cabinet as shown in FIG. 1. That is to say, the cabinet body 100 of the gas insulation switch cabinet provided by the embodiment includes a first side portion, a second side portion, and a central portion between the first side portion and the second side portion along the depth direction of the cabinet body; the first side portion includes a low-voltage chamber 1 and an operating mechanism chamber 78; the central portion includes a busbar chamber (e.g., an upper busbar chamber) 2, a breaker chamber 4 and a transformer 13; the breaker chamber 4 is between the busbar chamber 2 and the transformer 13 and between the busbar chamber 2 and the bottom of the cabinet body 100 of the gas insulation switch cabinet; and the second side portion includes the cable side disconnecting switch 11.

As shown in FIGS. 2 and 3, the low-voltage chamber 1 is at an upper part of the first side portion along the height direction of the cabinet body 100; the operating mechanism chamber 78 (for instance, provided with a busbar side disconnecting switch operating mechanism 7, a cable side disconnecting switch operating mechanism 7A and a breaker operating mechanism 8) is disposed at a middle part of the first side portion along the height direction of the cabinet body 100, so that the height direction of the cabinet body 100 can be the arrangement direction of the low-voltage chamber 1 and the operating mechanism chamber 78; the busbar chamber (e.g., the upper busbar chamber, provided with a main busbar 9 and a busbar side disconnecting switch 10) 2 is disposed at an upper part of the central portion along the height direction of the cabinet body 100; the breaker chamber 4 (provided with a breaker 14) is disposed at a middle part of the central portion along the height direction of the cabinet body 100; the transformer 13 is disposed at a lower part of the central portion along the height direction of the cabinet body 100; and the cable side disconnecting switch 11 (disposed in a cable side disconnecting switch chamber 16) is disposed at a middle part of the second side portion along the height direction of the cabinet body 100.

As can be seen from FIG. 2, in the embodiment, the rear busbar chamber 3 of the double-busbar gas insulation switch cabinet as shown in FIG. 1 is replaced by the cable side disconnecting switch chamber 16 provided with the cable side disconnecting switch 11; the cable chamber 6 is deviated towards the second side portion provided with the cable side disconnecting switch 11 along the thickness direction of the cabinet body from the lower part of the central portion along the height direction of the cabinet body, so that the cable chamber 6 can include a first portion disposed at the lower part of the second side portion along the height direction of the cabinet body 100 and a second portion disposed at the lower part of the central portion along the height direction of the cabinet body. The first portion is, for instance, a cable joint chamber 5 which is provided with a cable joint 65 configured to be connected with a current output terminal of a lead-in cable 12. The transformer (e.g., the current and/or voltage transformer) 13 is disposed below the breaker chamber 4 and close to the cable joint chamber 5 of the cable chamber 6 (disposed between the cable joint chamber 5 and a front cover 18 of the cabinet body 100 in the thickness direction of the cabinet body).

As shown in FIG. 2, a current path 15 marked with arrows displays that the current flows across the cable chamber 6 from the lead-in cable 12, then flows across the cable side disconnecting switch 11, then flows across the transformer 13, then flows across the breaker 14, and afterwards flows across the main busbar (the upper main busbar) 9 provided with the disconnecting switch 10, and then an outlet terminal is formed. The cable side disconnecting switch 11 is disposed at the front end of the transformer (e.g., a current transformer and/or a voltage transformer) 13. Thus, in the case of failure of the gas insulation switch cabinet provided by the embodiment, the power supply of the gas insulation switch cabinet provided by the embodiment can be cut off by switching off the cable side disconnecting switch 11, and a superior power supply unit connected with the gas insulation switch cabinet is not required to be cut off, so the power failure range can be reduced. Moreover, the wiring height of the lead-in cable joint 65 in the embodiment is consistent with the wiring height of the lead-in cable joint in FIG. 1, so the cabinet body structure of the double-busbar gas insulation switch cabinet not provided with the cable side disconnecting switch as shown in FIG. 1 can be shared by the gas insulation switch cabinet provided by the present embodiment to a great extent.

As can be seen from FIG. 3, the gas insulation switch cabinet includes a cable side disconnecting switch chamber 16 provided with a cable side disconnecting switch 11; the cable chamber 6 is mounted below the cable side disconnecting switch chamber 16, namely a lead-in cable 12 is connected to the cable side disconnecting switch chamber 16, and subsequently, the cable side disconnecting switch chamber 16 is connected to a side of the breaker chamber 4 close to the second side portion (referring to the left side of the breaker chamber 4 in FIG. 2); the busbar chamber (e.g., the upper busbar chamber) 2 is disposed above the breaker chamber 4; the operating mechanism 7 of the disconnecting switch in the busbar chamber 2, the breaker operating mechanism 8 and the cable side disconnecting switch operating mechanism 7A are disposed in the operating mechanism chamber 78; the operating mechanism chamber 78 is connected to a side of both the busbar chamber 2 and the breaker chamber 4 close to the first side portion (referring to the right side of both the busbar chamber 2 and the breaker chamber 4 in FIG. 2); the low-voltage chamber 1 is connected to a side of the busbar chamber 2 close to the first side portion (referring to the right side of the busbar chamber 2 in FIG. 2); and the cable chamber 6 of the double-busbar gas insulation switch cabinet is disposed below the low-voltage chamber 1 and provided with a front cover 18. As seen from the current path in FIG. 2, the cable side disconnecting switch chamber 16 is mounted between the cable chamber 6 and a transformer chamber 17 (as shown in FIG. 3) in the flowing direction of the current and disposed at the front end of the transformer 13. Thus, in the case of failure of the gas insulation switch cabinet provided by the embodiment, the main body of the gas insulation switch cabinet can be cut off by switching off the cable side disconnecting switch 11, and a superior power supply unit is not required to be cut off, so the power failure range can be reduced.

For instance, in the embodiment as shown in FIGS. 2 and 3, as the cable side disconnecting switch is disposed but the rear main busbar is not disposed at the position provided with the rear busbar chamber of the double-busbar gas insulation switch cabinet, the gas insulation switch cabinet may be a single-busbar gas insulation switch cabinet.

FIG. 4 is a front disassembly view of a partial cabinet body of a gas insulation switch cabinet provided by another embodiment of the present disclosure. The cabinet body of the gas insulation switch cabinet provided by the embodiment also includes a first side portion, a second side portion, and a central portion between the first side portion and the second side portion along the depth direction (the thickness direction, for instance, the arrangement direction of an operating mechanism chamber 78 and a breaker chamber 4), and the arrangement direction of the first side portion, the second side portion and the central portion is opposite to that in FIG. 1.

For instance, in the embodiment as shown in FIG. 4, a cabinet body 100 of the gas insulation switch cabinet is a cabinet body of a double-busbar gas insulation switch cabinet. For instance, a transformer 13 is disposed at the position provided with the rear busbar chamber 03 of the double-busbar gas insulation switch cabinet as shown in FIG. 1. That is to say, the cabinet body of the gas insulation switch cabinet in the embodiment includes a first side portion, a second side portion, and a central portion between the first side portion and the second side portion along the depth direction of the cabinet body; the first side portion includes a low-voltage chamber 1 and the operating mechanism chamber 78; the central portion includes a busbar chamber (e.g., an upper busbar chamber) 2, the breaker chamber 4 and a cable chamber 6; the breaker chamber 4 is between the busbar chamber 2 and the cable chamber 6; and the second side portion includes a cable side disconnecting switch 11 and the transformer 13.

As can be seen from FIG. 4, the low-voltage chamber 1 is disposed at an upper part of the first side portion along the height direction of the cabinet body; the operating mechanism chamber 78 is disposed at a middle part of the first side portion along the height direction of the cabinet body and disposed below the low-voltage chamber 1; the busbar chamber (e.g., the upper busbar chamber) 2 is disposed is at an upper part of the central portion along the height direction of the cabinet body; the breaker chamber 4 is at a middle part of the central portion along the height direction of the cabinet body; the cable chamber 6 is disposed at a lower part of the central portion along the height direction of the cabinet body; the transformer (e.g., a current transformer and/or a voltage transformer) 13 is disposed at a middle part of the second side portion along the height direction of the cabinet body; and the cable side disconnecting switch 11 is disposed at a lower part of the second side portion along the height direction of the cabinet body.

As shown in FIG. 4, a lead-in cable 12 is connected to the cable side disconnecting switch 11 through the cable chamber 6, and subsequently, the cable side disconnecting switch 11 is connected to the transformer (e.g., the current transformer and/or the voltage transformer) 13; the cable side disconnecting switch 11 is disposed below the transformer 13; the transformer 13 is mounted on a side of the breaker chamber 4 close to the second side portion (referring to the left side of the breaker chamber 4 in FIG. 4); the busbar chamber 2 provided with a main busbar 9 and a disconnecting switch 10 is disposed above the breaker chamber 4; the operating mechanism chamber 78 is connected to a side of both the busbar chamber 2 and the breaker chamber 4 close to the first side portion (referring to the right side of both the busbar chamber 2 and the breaker chamber 4 in FIG. 4); and the low-voltage chamber 1 is connected to the right side of the busbar chamber 2.

As can be seen from FIG. 4, the cable side disconnecting switch 11 is mounted between the cable chamber 6 and the transformer 13 in the flowing direction of the current and is still disposed at the front end of the transformer 13. Thus, in the case of failure of the gas insulation switch cabinet, the main body of the gas insulation switch cabinet can be cut off by switching off the cable side disconnecting switch 11, and a superior power supply unit is not required to be cut off, so the power failure range can be reduced. Similarly, the wiring height of the lead-in cable joint in the embodiment is consistent with the wiring height of the lead-in cable joint in FIG. 1, so the design platform of the double-busbar gas insulation switch cabinet not provided with the cable side disconnecting switch can be shared by the gas insulation switch cabinet provided by the embodiment of the present application to a great extent.

For instance, in the embodiment as shown in FIG. 4, as the transformer is disposed but the rear main busbar is not disposed at the position of the rear busbar chamber of the cabinet body of the double-busbar gas insulation switch cabinet, the gas insulation switch cabinet may be a single-busbar gas insulation switch cabinet.

The gas insulation switch cabinet provided by the embodiments of the present disclosure is not limited to the above embodiments, as long as the gas insulation switch cabinet can be electrically isolated on the incoming side.

For instance, the cable side disconnecting switch is disposed at the back end of the transformer in the flowing direction of the current. In this case, for instance, the gas insulation switch cabinet is a double-busbar gas insulation switch cabinet. For instance, the cabinet body of the gas insulation switch cabinet is a cabinet body of the double-busbar gas insulation switch cabinet. Description will be given below with reference to FIG. 5.

FIG. 5 is a structural front disassembly view of a partial cabinet body of a gas insulation switch cabinet provided by still another embodiment of the present disclosure. FIG. 5 is an improvement on the basis of the double-busbar gas insulation switch cabinet as shown in FIG. 1. The cabinet body of the gas insulation switch cabinet provided by the embodiment also includes a first side portion, a second side portion, and a central portion between the first side portion and the second side portion along the thickness direction, and the arrangement direction of the first side portion, the second side portion and the central portion is consistent with that in FIG. 1.

Compared with the embodiment as shown in FIGS. 2 and 4, the main difference of the embodiment as shown in FIG. 5 is that the gas insulation switch cabinet provided by the embodiment still includes two busbar chambers, namely an upper busbar chamber and a rear busbar chamber. As shown in FIG. 5, in a situation where a cable side disconnecting switch 11 is disposed at the back end of a transformer 13 in the flowing direction of the current, the cabinet body 100 includes a first side portion, a second side portion, and a central portion between the first side portion and the second side portion along the depth direction of the cabinet body. The busbar chamber (the upper busbar chamber) 2 is disposed at an upper part of the central portion along the height direction of the cabinet body. The cabinet body 100 also includes a rear busbar chamber 3 which is disposed at a middle part of the second side portion along the height direction of the cabinet body. The transformer 13 is disposed on a side of a cable chamber 6 (referring to a portion, disposed below an operating mechanism chamber 78 provided with a breaker operating mechanism 8, of the cable chamber 6) close to the second side portion. The cable side disconnecting switch 11 is disposed at a middle part of the central portion along the height direction of the cabinet body and between a breaker chamber 4 and the cable chamber 6.

In the embodiment as shown in FIG. 5, the current sequentially flows across the cable chamber 6 and the transformer 13 from a lead-in cable 12, then flows across the cable side disconnecting switch 11, then flows across the breaker chamber 4, and afterwards flows across the busbar chamber (the upper busbar chamber) 2 provided with a disconnecting switch and an upper main busbar, and then an outlet terminal is formed. The rear busbar chamber 3 is connected with the upper busbar chamber 2 through the breaker chamber 4, and the outlet terminal formed by the rear busbar chamber 3 can be switched to be in a work state as required. In the embodiment, the cable side disconnecting switch 11 is mounted at the back end of the transformer 13 in the flowing direction of the current, and the electrical isolation of the gas insulation switch cabinet on the incoming side can be still realized, so the power supply of the gas insulation switch cabinet can be cut off as required.

Detailed description will be given below to the embodiment of the gas insulation switch cabinet, in which no transformer is between the lead-in cable and the breaker, with reference to FIG. 6.

For instance, as shown in FIG. 6, the cabinet body 100 includes a first side portion, a second side portion, and a central portion between the first side portion and the second side portion along the depth direction; the first side portion includes a low-voltage chamber 1 and an operating mechanism chamber 78; the central portion includes a busbar chamber 2 and a breaker chamber 4; and the second side portion includes a cable side disconnecting switch 11. The current enters from the lead-in cable 12 and flows across a cable chamber 6, the cable side disconnecting switch 11, the breaker chamber 4 and the busbar chamber 2 in turn.

Figure 7:
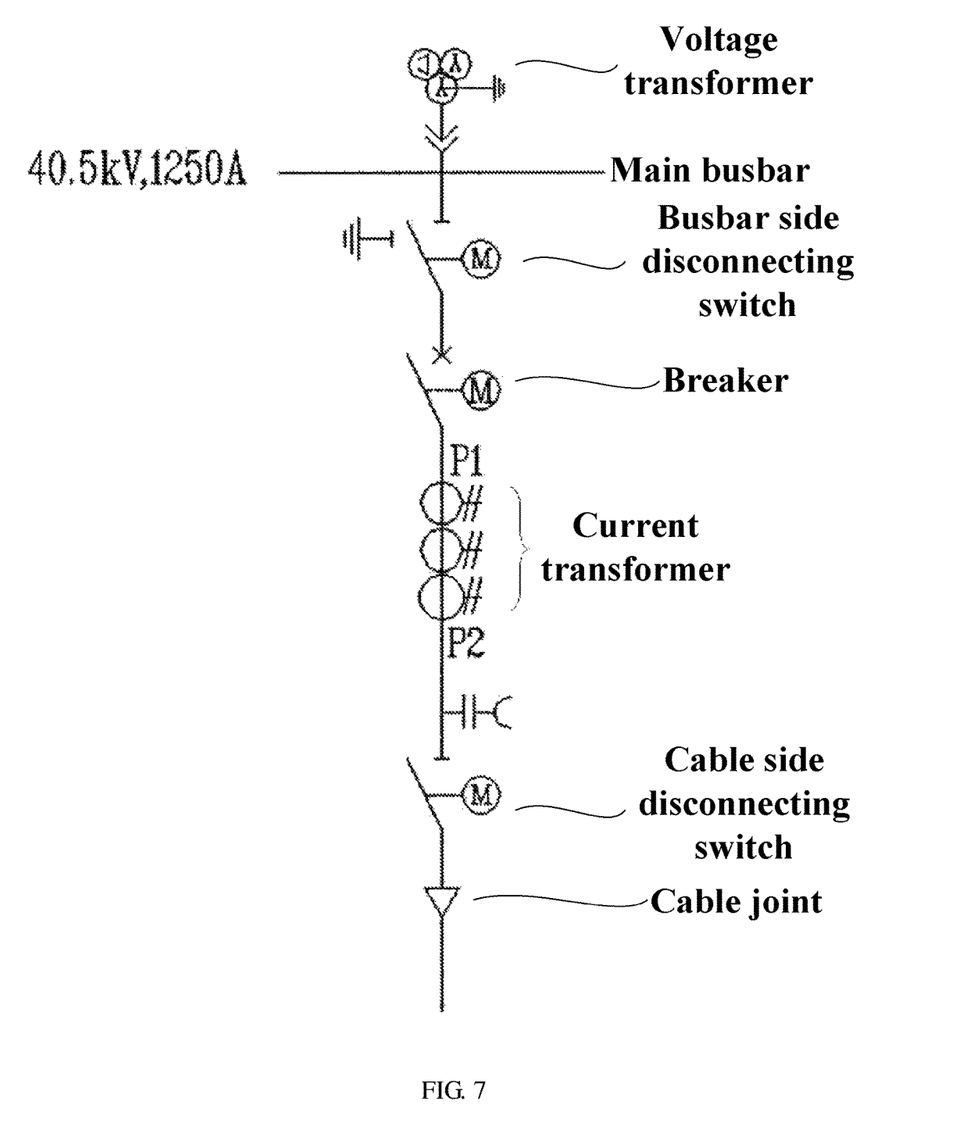
FIG. 7 is a system layout of a gas insulation switch cabinet provided by an embodiment of the present disclosure.

FIG. 7 is a system layout of the gas insulation switch cabinet provided by an embodiment of the present disclosure. In FIG. 7, the rated voltage and the rated current of the gas insulation switch cabinet are respectively 40.5 kV and 1,250 A. The system layout shows that the cable side disconnecting switch is disposed at the incoming side of the gas insulation switch cabinet, and the electrical isolation of the gas insulation switch cabinet at the incoming side can be realized, so the power supply of the gas insulation switch cabinet can be cut off as required.

Figure 8:
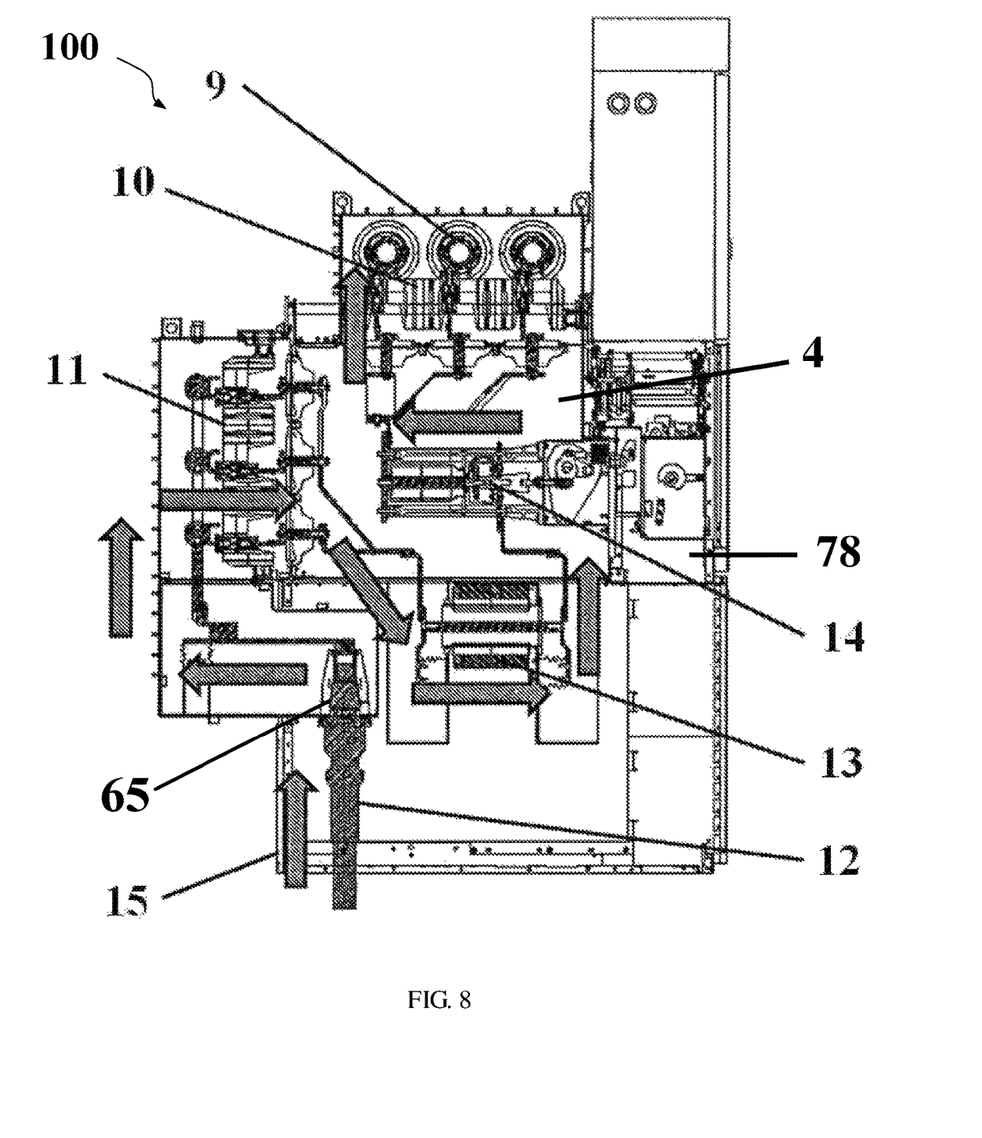
FIG. 8 is a schematic structural view of a switch device provided by an embodiment of the present disclosure.

At least one embodiment of the present disclosure further provides a switch device (e.g., a gas insulation switch cabinet). As illustrated in FIG. 8, the switch device includes: a cabinet body 100; a lead-in cable joint 65 disposed in the cabinet body 100; a cable side disconnecting switch 11 being disposed in the cabinet body 100 and including a current input terminal and a current output terminal (referring to a current path 15 in FIG. 8), in which the current input terminal of the cable side disconnecting switch 11 is electrically connected with the lead-in cable joint 65; and a breaker 14 being disposed in the cabinet body 100 and including a current input terminal and a current output terminal, in which the current input terminal of the breaker 14 is electrically connected with the current output terminal of the cable side disconnecting switch 11.

For instance, as illustrated in FIG. 8, the switch device further includes an operating mechanism chamber 78, and the operating mechanism chamber 78, a breaker chamber 4 where the breaker 14 is located and the cable side disconnecting switch 11 are sequentially arranged along a depth direction of the cabinet body 100.

For instance, the switch device further includes a main busbar 9; a busbar side disconnecting switch 10 is disposed at the position of the main busbar; the main busbar 9 is disposed in the cabinet body 100 and includes a current input terminal; and the current input terminal of the main busbar 9 is electrically connected with the current output terminal of the breaker 14.

For instance, the switch device further includes a transformer 13 which is disposed in the cabinet body 100 and between the lead-in cable joint 65 and the breaker 14. For instance, a current input terminal of the transformer 13 is connected with the current output terminal of the cable side disconnecting switch 11 (as shown in FIG. 8), or a current output terminal of the transformer 13 is connected with the current input terminal of the cable side disconnecting switch 11.

The switch device provided by the embodiments of the present disclosure may be a gas insulation switch cabinet or any other switching element. The settings of components of the switch device may refer to the relevant description in the embodiments of the gas insulation switch cabinet.

In summary, the embodiments of the present disclosure provide a gas insulation switch cabinet and a switch device, in particular to a gas insulation switch cabinet and a switch device capable of being electrically isolated at an incoming side. The embodiments of the present disclosure can realize the electrical isolation of the gas insulation switch cabinet at the incoming side, share the design platform of the gas insulation switch cabinet not provided with an electrical isolation switch at the incoming side to a great extent, and avoid the potential safety hazard caused by wrongly closing a superior power supply unit. In some embodiments, the wiring height of the cable joint of the gas insulation switch cabinet provided by the embodiments of the present disclosure may also be consistent with the wiring height of the cable joint of the gas insulation switch cabinet not provided with the electrical isolation switch at the incoming side.

It should be understood that the described embodiments are related to the illustrative embodiments only and not limitative to the scope of the disclosure, the scopes of the disclosure are defined by the accompanying claims. Various modifications and improvements may be made to the described embodiments without departing from the scope of the present disclosure.

What is claimed is:

1. A gas insulation switch cabinet, comprising:
a cabinet body;
a cable chamber, a breaker chamber and a busbar chamber which are in the cabinet body and configured that a current sequentially flows through the cable chamber, the breaker chamber and the busbar chamber; and
a cable side disconnecting switch between the cable chamber and the breaker chamber in a flowing direction of the current,
wherein the gas insulation switch cabinet further comprises an operating mechanism chamber, the operating mechanism chamber, the breaker chamber and the cable side disconnecting switch are sequentially arranged along a depth direction of the cabinet body.

2. The gas insulation switch cabinet according to claim 1, further comprising a transformer, wherein the transformer is between the cable chamber and the breaker chamber in the flowing direction of the current.

3. The gas insulation switch cabinet according to claim 2, wherein the cable side disconnecting switch is at a front end of the transformer in the flowing direction of the current.

4. The gas insulation switch cabinet according to claim 3, further comprising a low-voltage chamber, wherein
the cabinet body comprises a first side portion, a second side portion, and a central portion between the first side portion and the second side portion along the depth direction of the cabinet body;
the low-voltage chamber is at an upper part of the first side portion along a height direction of the cabinet body;
the operating mechanism chamber is at a middle part of the first side portion along the height direction of the cabinet body;
the busbar chamber is at an upper part of the central portion along the height direction of the cabinet body;
the breaker chamber is at a middle part of the central portion along the height direction of the cabinet body;
the cable side disconnecting switch is at a middle part of the second side portion along the height direction of the cabinet body;
the transformer is at a lower part of the central portion along the height direction of the cabinet body; and
the cable chamber comprises a portion at a lower part of the second side portion along the height direction of the cabinet body.

5. The gas insulation switch cabinet according to claim 4, wherein the cabinet body is a cabinet body of a double-busbar gas insulation switch cabinet.

6. The gas insulation switch cabinet according to claim 4, wherein the gas insulation switch cabinet is a single-busbar gas insulation switch cabinet.

7. The gas insulation switch cabinet according to claim 3, further comprising a low-voltage chamber, wherein
the cabinet body comprises a first side portion, a second side portion, and a central portion between the first side portion and the second side portion along the depth direction of the cabinet body;
the low-voltage chamber is at an upper part of the first side portion along a height direction of the cabinet body;
the operating mechanism chamber is at a middle part of the first side portion along the height direction of the cabinet body;
the busbar chamber is at an upper part of the central portion along the height direction f the cabinet body;
the breaker chamber is at a middle part of the central portion along the height direction of the cabinet body;
the transformer is at a middle part of the second side portion along the height direction of the cabinet body;
the cable chamber is at a lower part of the central portion along the height direction of the cabinet body; and
the cable side disconnecting switch is at a lower part of the second side portion along the height direction of the cabinet body.

8. The gas insulation switch cabinet according to claim 7, wherein the cabinet body is a cabinet body of a double-busbar gas insulation switch cabinet.

9. The gas insulation switch cabinet according to claim 7, wherein the gas insulation switch cabinet is a single-busbar gas insulation switch cabinet.

10. The gas insulation switch cabinet according to claim 1, wherein a cable joint is in the cable chamber; and a height of the cable joint is 400-500 mm.

11. The gas insulation switch cabinet according to claim 1, wherein the operating mechanism of the cable side disconnecting switch is in the operating mechanism chamber.

12. The gas insulation switch cabinet according to claim 1, wherein the gas insulation switch cabinet is a single-busbar gas insulation switch cabinet.

13. The gas insulation switch cabinet according to claim 1, further comprising a lead-in cable, wherein the lead-in cable comprises a part in the cable chamber.

* * * * *